OR 3,963,312

United States

Wild

[11] 3,963,312

[45] June 15, 1976

[54] CONTROLLABLE LIQUID-CRYSTAL DISPLAY DEVICE

[75] Inventor: Peter Wild, Wettingen, Switzerland

[73] Assignee: BBC Brown Boveri & Company Limited, Baden, Switzerland

[22] Filed: Sept. 11, 1974

[21] Appl. No.: 505,139

[30] Foreign Application Priority Data

Sept. 27, 1973 Switzerland.................. 13837/73

[52] U.S. Cl. .......................................... 350/160 LC
[51] Int. Cl.² ........................................ G02F 1/13
[58] Field of Search ............................ 350/160 LC

[56] References Cited
UNITED STATES PATENTS
3,731,986  5/1973  Fergason ............... 350/160 LC X OTHER PUBLICATIONS
Scheffer, "New Multicolor Liquid Crystal . . .", J. Appl. Phys., Vol. 44, No. 11, pp. 4799–4803, Nov. 1973.

Primary Examiner—John K. Corbin
Assistant Examiner—Matthew W. Koren
Attorney, Agent, or Firm—Oblon, Fisher, Spivak, McClelland & Maier

[57] ABSTRACT

An improved liquid-crystal display exhibiting both a relatively bright background and good contrast between the background and displayed characters is disclosed. The display includes a liquid-crystal contained between a pair of support plates carrying transparent electrodes. First and second polarizers of differing characteristics are positioned on opposite sides of the liquid-crystal and a suitable reflector is combined with one of the polarizers.

9 Claims, 1 Drawing Figure

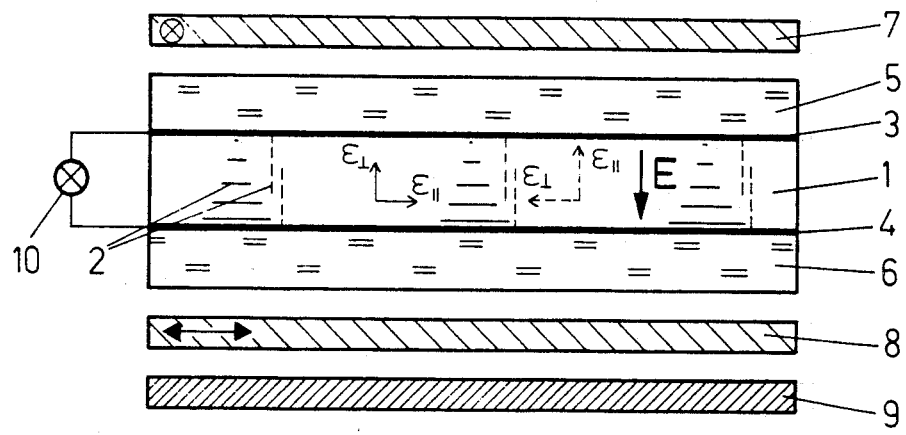

CONTROLLABLE LIQUID-CRYSTAL DISPLAY DEVICE

BACKGROUND OF THE INVENTION

1. Field of the Invention

The invention relates generally to a controllable liquid-crystal display device and more particularly to a display device including a liquid crystal contained between transparent electrodes located on two plane surfaces, between a first transparent support plate and a second support plate and between a first polarizer and a second polarizer combined with a reflector.

2. Description of the Prior Art

Such controllable liquid-crystal display devices are already known from DOS No. 2,158,563.

In such known display devices the incident light must pass twice through the polarizers, the support plates and the liquid crystal. In the bright position, therefore, (transmitting directions of both polarizers are perpendicular to each other when using a nematic liquid crystal with a 90° helical structure) the intensity of the outgoing light is considerably weaker than the incoming, non-polarized light. With the usual linear polarizers, however, an arbitrarily high transmissivity cannot be achieved, because even in the ideal case only light oscillating in a certain direction is transmitted, while the polarizer absorbs the light oscillating in other directions. In the case of commercially available polarizers, polarizers with the greatest transmissivity show the lowest extinction ratio, where by extinction ratio is meant the relationship of the intensity of light passing through a pair of polarizers with parallel axes to that passing through a polarizer pair with crossed axes. Under unfavorable lighting conditions, therefore, the case of reading a liquid-crystal display device operating by reflection can be severely impaired.

The commercial polarizer known as the Polaroid HN 42 for non-polarized incident light, for example, has a transmissivity of 35% for two polarizers in the bright position, and a maximum attainable extinction ratio of 1 : 70. In the case of a display with a bright background, therefore, the brightness of the background is equivalent to less than 35% of the incident light because the reflector is often made diffusive to avoid undesired reflection of the light source, and the light when reflected back has to pass through the display again. For this reason, the display is difficult to read under conditions of low ambient lighting level, even when the contrast between the electrically energized characters and the background is adequate. An improvement in legibility by brightening the background can be achieved with a Polaroid HN 55 polarizer pair, but contrast is then much poorer.

SUMMARY OF THE INVENTION

Accordingly it is one object of the invention to create a liquid-crystal display device which exhibits both good contrast between background and displayed characters, and also a sufficiently bright background.

This and other objects of the invention are achieved by the use of polarizers of such a kind that the first polarizer in conjunction with another polarizer of the same type exhibits a high extinction ratio and the second polarizer in conjunction with another polarizer of the same type exhibits a comparatively low extinction ratio and the reflector scatters little or no light.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a sectional, exploded view of the liquid-crystal display device of the present invention.

DESCRIPTION OF THE PREFERRED EMBODIMENT

Referring now to drawing, the reference number 1 denotes a nematic liquid crystal, the molecule groups 2 of which are orientated in 90° helical structure through suitable surface treatment of support plates 5, 6 and of transparent electrodes 3, 4 located on the plates. Two polarizers 7, 8 rotated through 90° with respect to each other, and a reflector 9, complete the liquid-crystal display device, which is connected to a voltage source 10. The reference numeral 11 represents a light source from which light 12 falls on the display assembly, and 13 is an observer who perceives the light 14 reflected from the display device. The symbol $\epsilon_\parallel$ represents the dielectric constant along the longitudinal axis of the molecule groups 2, and $\epsilon_\perp$ represents the dielectric constant perpendicular to this axis.

In a manner similar to the liquid crystal display described in DOS No. 2,158,533, the 90° helical structure of the liquid-crystal layer 1 has the effect of turning through 90° the plane of oscillation of the linearly polarized light passing through the front polarizer 7, and therefore causes the rear polarizer 8, acting as an analyser, to transmit the maximum light intensity when in the position shown in FIG. 1, i.e. when the polarizers 7 and 8 are crossed with respect to each other. The light reflected by reflector 9 then passes in the reverse direction through polarizer 8, support plate 6, electrode coating 4, liquid crystal 1, electrode coating 3, support plate 5 and polarizer 7 to the observer 13, who perceives maximum brightness on the display device.

If the liquid-crystal molecule groups 2 exhibit positive anisotropy of the dielectric constant, i.e. if $\epsilon_\parallel$ is greater than $\epsilon_\perp$, the electric field built up between the electrodes 3, 4 by applying a sufficiently high electric voltage, as indicated by the broken lines in FIG. 1, has the effect of largely aligning the liquid-crystal molecule groups 2 in the field direction E, whereupon the optical activity of liquid-crystal layer 1 is largely eliminated, and in this state the brightness of the display as shown in FIG. 1, is perceived by the observer to be much less than in the state with no voltage. Therefore, if voltage is applied only to certain portions of electrodes 3, 4, e.g. in the shape of numerals, the observer will perceive dark numerals on a bright background, their legibility being substantially improved by the invention through the use of suitable polarizers 7, 8 and reflectors 9.

The first and second polarizers 7, 8 can of course also have the same orientation, in which case bright, energized characters can be displayed on a dark background.

The reflector 9 of FIG. 1 consists, for example, of an aluminium foil which is slightly roughened on the display side and thus scatters light in some degree. A reflector 9 of this kind can be obtained by brushing and then anodizing one side of a bright aluminium foil. Its only slightly roughened surface reflects collimated incident light chiefly within a narrow range of angles which is symmetrical to the angle of reflection as defined for ideal mirrors. The criterion for the amount of roughening is that the reflector surface should be roughened only to such an extent that the light source 11 is just no longer reflected as from a mirror.

In another configuration according to the invention, a bright specular aluminium foil is used in conjunction with polarizer 7 roughened on the viewing side. The first polarizer 7 is, for example, a commercial polarizer of the Polaroid HN 42 type with a transmissivity of 35% in the bright position (axes parallel) and of 0.5% in the dark position (axes crossed), thus allowing a maximum contrast of 1 : 70 in the transmitted light mode. The second polarizer 8 is a commercial polarizer of the Polaroid HN 55 type with a transmissivity of 45% in the bright position and 22% in the dark position, thus allowing a maximum contrast of 1 : 2 in the transmitted light mode.

With this arrangement of the polarizers 7, 8 in the display device, one obtains a background which is much brighter than that obtained with two identical polarizers of type Polaroid HN 42, and a contrast which is visually scarcely distinguishable from that achieved with two polarizers of type Polaroid HN 42.

A similar effect can be achieved with other types of polarizers, such as a Polaroid HN 48 instead of the HN 42 device.

Surprisingly, this brightening of the background while retaining almost the same contrast is achieved only with the arrangement of the invention. If the polarizers 7 and 8 are interchanged, the same background brightness is obtained but there is a serious loss of contrast owing to brightening of the energized electrode areas in the shape of numerals, for example.

The effect of the invention can thus be achieved only if the non-polarized incident light 12 is sufficiently strongly polarized by the first polarizer 7. The second polarizer does not have to meet the same exacting requirements as regards polarizing capacity because reflector 9 scatters light only slightly and therefore the degree of polarization of the reflected light largely corresponds to the degree of polarization of the incident light.

Since the requirements demanded of the second polarizer 8 are less than for the first polarizer 7, the liquid-crystal display device can be built partly by employing thin-film techniques. Possible sequences of the films are then liquid-crystal layer 1, electrode 4, polarizer 8, support plate 6, reflector 9, or liquid-crystal layer 1, electrode 4, polarizer 8, reflector 9, support plate 6, or liquid-crystal layer 1, polarizer 8, electrode 4, reflector 9, support plate 6. In the last-mentioned arrangement the polarizer 8 must have a sufficiently high electrical capacitance (small film thickness and high dielectric constant) to be able to energize the liquid-crystal layer 1 by alternating voltage (capacitive voltage divider). Furthermore, in this case the reflector 9 must not influence the electrical functioning of the segmented electrodes 4.

In the manufacture of liquid-crystal display devices using thin-film techniques, the reflector 9 is either suitably segmented so as to act simultaneously as an electrode, or an insulating intermediate coating (e.g. silicon oxide) is evaporated onto the reflecting metal layer before the transparent electrode is applied. The two arrangements mentioned in the preceding paragraph have the advantage that parallax phenomena are largely eliminated.

A linearly dichroic polyvinyl alcohol (PVA) film produced by photographic means can be used as a thin-film polarizer 8. When making a film of this kind, a PVA film is first made light-sensitive with a suitable aqueous solution of cupric chloride and ammonium dichromate. A pattern of parallel lines then serves as a photomask for selectively illuminating the photosensitive layer. After developing, dichroic pigment molecules of the kind used for conventional polarizers become incorporated only along the thin, unexposed strips, resulting in a film with dichroic pigment molecules oriented largely in parallel.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A controllable liquid-crystal display device comprising:
    first and second transparent support plates,
    a transparent electrode on a plane surface of each of said transparent support plates,
    a liquid crystal contained between said first and second transparent support plates and said transparent electrodes,
    first and second approximately neutral polarizers, positioned on opposite sides of said liquid crystal, said polarizers being of such a type that said first polarizer in conjunction with another polarizer of the same type exhibits a high extinction ratio and said second polarizer in conjunction with another polarizer of the same type exhibits a relatively low extinction ratio; and
    a reflector of low light scattering characteristics adjacent said second polarizer.

2. A controllable liquid-crystal display device as in claim 1, wherein:
    the transmissivity for non-polarized light of said first polarizer is less than that of said second polarizer.

3. A controllable liquid-crystal display device as in claim 1, wherein: said first polarizer is a Polaroid type HN 42 polarizer.

4. A controllable liquid-crystal display device as in claim 1, wherein:
    said first polarizer is a Polaroid type HN 48 polarizer.

5. A controllable liquid-crystal display device as in claim 1, wherein:
    said reflector is formed of a slightly roughened and anodized aluminum foil.

6. A controllable liquid-crystal display device as in claim 1, wherein:
    said second polarizer is a Polaroid type HN 55 polarizer.

7. A controllable liquid-crystal display device as in claim 1, wherein:
    said second polarizer and said reflector are located between said liquid crystal and said second support plate.

8. A controllable liquid-crystal display device as in claim 7, wherein:
    said second polarizer is a film having uniformly oriented dichroic pigment molecules.

9. A controllable liquid-crystal display device as in claim 1, wherein:
    said liquid-crystal display device is comprised predominantly of thin-film layers.

* * * * *